(12) United States Patent
El Khourassani et al.

(10) Patent No.: US 10,740,141 B2
(45) Date of Patent: Aug. 11, 2020

(54) METHOD FOR MANAGING TRANSACTIONS ROUTING BETWEEN SOURCE EQUIPMENT AND TARGET EQUIPMENT

(71) Applicant: STMicroelectronics (Rousset) SAS, Rousset (FR)

(72) Inventors: Yassine El Khourassani, Antibes (FR); Patrick Valdenaire, Roquefort les Pins (FR); Emmanuel Ardichvili, Valbonne (FR)

(73) Assignee: STMicroelectronics (Rousset) SAS, Rousset (FR)

(*) Notice: Subject to any disclaimer, the term of this patent is extended or adjusted under 35 U.S.C. 154(b) by 0 days.

(21) Appl. No.: 16/362,207

(22) Filed: Mar. 22, 2019

(65) Prior Publication Data
US 2019/0317799 A1 Oct. 17, 2019

(30) Foreign Application Priority Data

Apr. 16, 2018 (FR) .................................. 18 53304

(51) Int. Cl.
*G06F 12/0853* (2016.01)
*G06F 9/46* (2006.01)
*G06F 16/901* (2019.01)
*G06F 12/0886* (2016.01)

(52) U.S. Cl.
CPC .......... *G06F 9/467* (2013.01); *G06F 12/0853* (2013.01); *G06F 12/0886* (2013.01); *G06F 16/9017* (2019.01)

(58) Field of Classification Search
None
See application file for complete search history.

(56) References Cited

U.S. PATENT DOCUMENTS

| 5,754,792 | A  | * | 5/1998 | Shutoh | G06F 11/1443 |
|           |    |   |        |        | 709/243 |
| 6,023,454 | A  | * | 2/2000 | Deroux-Dauphin | ............... |
|           |    |   |        |        | G06F 13/4022 |
|           |    |   |        |        | 370/235 |
| 8,006,026 | B2 | * | 8/2011 | Kajigaya | G06F 13/1657 |
|           |    |   |        |        | 365/189.04 |
| 9,335,939 | B2 | * | 5/2016 | Bennett | G06F 3/0614 |

(Continued)

FOREIGN PATENT DOCUMENTS

FR 2742894 A1 6/1997

OTHER PUBLICATIONS

Venkateswara Rao, M., et al., "A Frame work on AMBA bus based Communication Architecture to improve the Real Time Computing Performance in MPSoC", International Journal of Computer Applications (0975-8887), vol. 31, No. 5, Apr. 2014, 5 pages.

(Continued)

*Primary Examiner* — Elias Mamo
(74) *Attorney, Agent, or Firm* — Slater Matsil, LLP

(57) ABSTRACT

A system on chip includes an interconnect circuit having an input interface and a number of output interfaces. A source device is coupled to the input interface. A target device includes a sectorized addressable memory space and a number of access ports respectively coupled to the output interfaces. The source device is configured to deliver a transaction containing an address word to the target device.

22 Claims, 3 Drawing Sheets

(56) References Cited

U.S. PATENT DOCUMENTS

2005/0125574 A1* 6/2005 Foster ................. G06F 13/404
                                                    710/36
2006/0067123 A1* 3/2006 Jigour ................. G11C 7/1045
                                                    365/185.05
2016/0203096 A1    7/2016 Arbel et al.

OTHER PUBLICATIONS

Gerstlauer, Andreas, "EE382V: Sytstem-on-a-Chip (SoC) Design", Lecture 12—SoC Communication Architectures, Electrical and Computer Engineering, University of Texas at Austin, 2014, 43 pages.

* cited by examiner

METHOD FOR MANAGING TRANSACTIONS ROUTING BETWEEN SOURCE EQUIPMENT AND TARGET EQUIPMENT

CROSS-REFERENCE TO RELATED APPLICATIONS

This application claims priority to French Patent Application No. 1853304, filed on Apr. 16, 2018, which application is hereby incorporated herein by reference.

TECHNICAL FIELD

This disclosure relates generally to routing between devices, and in particular embodiments to a method for managing transactions routing between a source equipment and a target equipment.

BACKGROUND

There is a need to be able to manage such routing, for example depending on an address-priority and/or quality-of-service (QoS) criterion, and flexibly depending on the envisaged application. Specifically, different applications may employ different devices and/or may require different addressing-priority criteria to be assigned depending on the nature of the source devices.

SUMMARY

According to one aspect there is proposed a system on chip that includes an interconnect circuit including at least one input interface and a plurality of output interfaces. At least one source device is coupled to the input interface. A t least one target device, for example a multiport memory, possesses a sectorized addressable space and a plurality of access ports respectively coupled to the output interfaces. The at least one source device is configured to deliver transactions (for example, read or write transactions) containing address words to the at least one target device.

When a plurality of source devices are provided, transactions emitted by different source devices may be emitted sequentially or simultaneously.

When a plurality of target devices are provided, all may receive transactions originating from all the source devices or indeed certain of these target devices may receive transactions from only certain of the source devices.

The system on chip also contains at least one programmable control module coupled to the at least one source device.

This control module includes a table (look-up table) that is configured, once the control module has been programmed, to indicate, for each sector of the addressable space, one of the access ports.

This control module also includes a control circuit that is able, in the presence of each transaction originating from the at least one source device, to deliver, to the interconnect circuit, a control word designating the access port indicated in the table based on the address word contained in the transaction.

The interconnect circuit is then configured to route the transaction from the at least one input interface to the output interface coupled to this access port and to deliver the transaction to the access port, the content of each transaction delivered to an access port being identical to the content of the corresponding transaction delivered by the source device whatever the selected access port.

Thus, the interconnect circuit is configured to receive, with each transaction, a control word and to route the transaction to one of the access ports depending on the value of this control word.

Furthermore, depending on the envisaged application, i.e., for example depending on the nature of the one or more source devices and on a need to assign a priority to certain addressing transactions originating from one or more source devices, the user will possibly program, for each source device, the content of the associated table so as to assign an access port of the one or more target devices to each sector of the addressing space of the corresponding target device.

Thus, for each transaction originating from a source device, the control circuit contained in the control module will be able to verify which sector is targeted by the address word contained in the transaction and to adjust the value of the corresponding control word so as to designate the access port associated with this sector and mentioned in the corresponding table.

The interconnect circuit is then configured, in the presence of such a value of the control word, to route the transaction from the at least one input interface to the output interface coupled to this chosen access port.

Moreover, whatever the access port chosen for a transaction originating from a source device, the transaction content delivered to the access port is identical to the transaction content delivered by the source device. In other words, if for example the target device is a double port memory, and if the transaction includes a memory write address, the transaction must not be disrupted by the control word, i.e. its content must be identical whatever the access port of the memory, to ensure the transaction is routed to the same address in the memory space of the memory, irrespectively of the access port on which it is received.

Thus, the same system on chip may be used for various applications for example requiring different priorities to be assigned and therefore different access ports to be allocated.

According to one implementation, a particularly simple way of ensuring that the content of each transaction delivered to an access port is identical to the content of the corresponding transaction delivered by the source device whatever the selected access port, is to make provision for each transaction to be routed conjointly with the control word to the corresponding output interface, and for the output interface to be configured to not deliver the control word to the corresponding access port.

According to one embodiment, each transaction is incorporated within a main word of n bits whereas the control word includes m additional bits.

The value of m is at least equal to 1 and depends on the number of access ports to be selected.

Thus, if the number of access ports is equal to 2, m will possibly be equal to 1. If the number of access ports is equal to 3 or 4, m will be equal to 2.

Each control circuit is configured to adjust the value of the m bits so as to designate the access port based on the address word contained in the transaction and of the corresponding table.

Each input interface is then configured to receive an overall word of n+m bits including the main word and the control word.

The interconnect circuit is then advantageously configured to route the overall word to the corresponding output interface, and the corresponding output interface is advantageously configured to not deliver the control word to the access port.

According to one embodiment, each input interface is coupled to the corresponding source device by an input bus of n tracks and to the corresponding control module by a control bus of m tracks.

The overall word of n+m bits is intended to be routed over an internal network of buses of n+m tracks within the interconnect circuit.

Each output interface is configured to receive an internal bus of n+m bits and is coupled to the corresponding access port by an output bus of n tracks, the m tracks of the internal bus of n+m tracks leading to the corresponding output interface are not connected to the access port.

It is possible for the control module to be programmable by the at least one source device.

When a plurality of source devices are respectively coupled to a plurality of corresponding control modules, the interconnect circuit then including a plurality of input interfaces respectively coupled to the source devices, each control module may be programmable by one of the source devices.

The source device able to program each control module may include a programmable core or a microprocessor.

This source device may advantageously incorporate a software application containing instructions intended to program each table contained in each control module.

The at least one target device may include a multiport memory.

According to another aspect, there is proposed a method for managing the routing of transactions within a system on chip between at least one source device delivering the transactions and at least one target device having a sectorized addressable space and a plurality of access ports, each transaction containing an address word.

The method according to this aspect includes equipping the system on chip with an interconnect circuit including at least one input interface and a plurality of output interfaces, coupling respectively the at least one input interface to the at least one source device and coupling respectively the output interfaces to the access ports, configuring each input interface so that it can receive each transaction originating from the corresponding source device and a control word of programmable value associated with this transaction, configuring the interconnect circuit so that each transaction and its control word are routed to one of the output interfaces depending on the value of the control word, configuring each output interface so that the corresponding transaction is delivered to the access port coupled to this output interface and so that the corresponding control word is not limited to this access port, and for each source device, programming a table indicating one of the access ports for each sector of the memory space, and for each transaction, adjusting the value of the control word depending on the address word contained in the transaction and on the content of the table.

According to one implementation, the method includes loading into the at least one source device a software application containing instructions for programming the table, and programming the table by executing the software application.

According to one implementation, applicable to managing the routing of transactions within the system on chip between a plurality of source devices delivering the transactions and the at least one target device, the method includes loading into one of the source devices a software application containing instructions for programming each table associated with each source device, and programming the tables by executing the software application.

The source device containing the software application may include a programmable core or a microprocessor.

The at least one target device may include a multiport memory.

BRIEF DESCRIPTION OF THE DRAWINGS

Other advantages and features of the invention will become apparent from the completely non-limiting detailed description of implementations and embodiments, and the appended drawings, in which.

DETAILED DESCRIPTION OF ILLUSTRATIVE EMBODIMENTS

Implementations and embodiments of the invention relate to the routing of transactions between at least one source device and at least one target device, for example but non-limitingly a multiport memory, within a system on chip (SoC), and more particularly to the management of the routing of such transactions with the aim of addressing a sectorized memory space of the target device.

Figure 1:
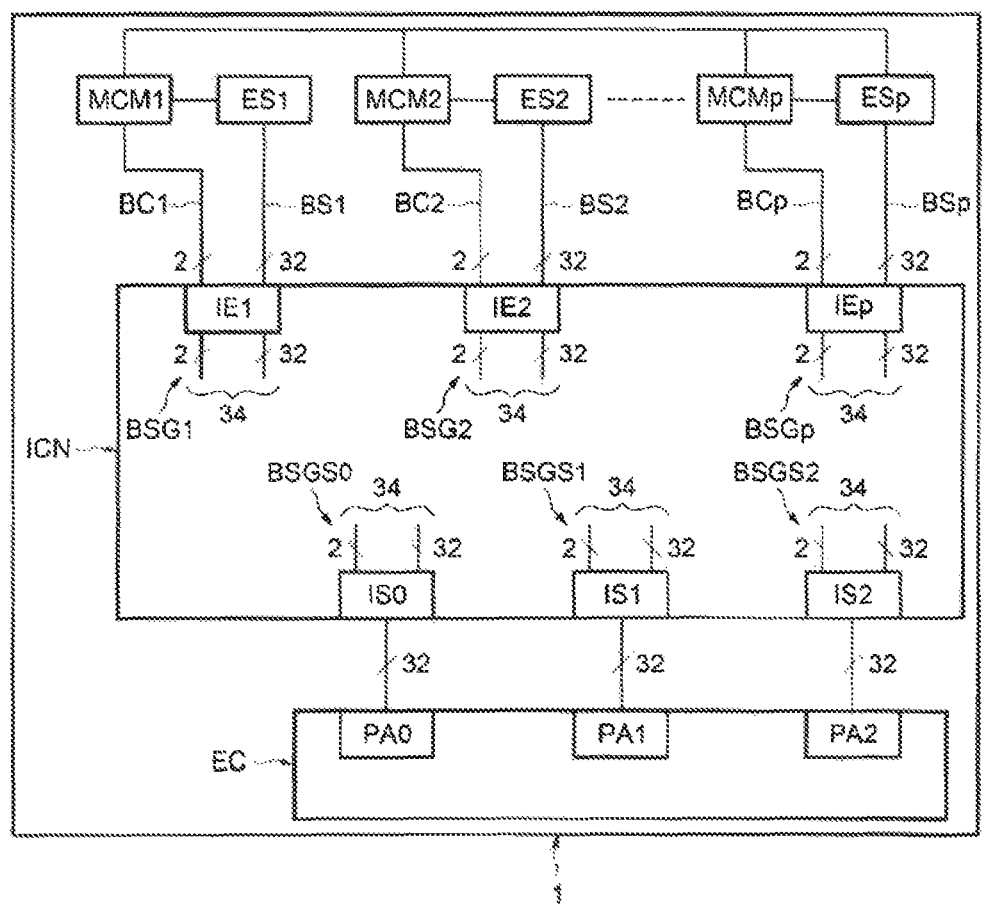
FIGS. 1 to 6 schematically illustrate implementations and embodiments of the invention.
Figure 2:
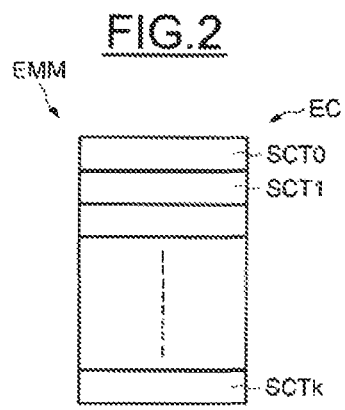

In FIG. 1, the reference 1 designates a system on chip including a plurality of source devices ES1-ESp that may be of different types/natures.

Thus, one of the devices, for example the device ES1, may be an LCD screen controller, another device, for example the device ES2, may be a processor for signal processing, another source device may for example be a decoder and another source device, for example the device ESp, may be a microprocessor, for example a microprocessor sold by the company STMicroelectronics under the reference STM32.

The system on chip 1 also includes at least one target device EC, for example a multiport random access memory, here a memory including three access ports PA0, PA1 and PA2.

Of course, a plurality of target devices, of different or identical nature, may be provided on the system on chip 1.

In order to interconnect circuit the source devices ESi with the target device EC, the system on chip 1 also includes an interconnect circuit ICN.

This interconnect circuit ICN includes input interfaces IE1-IEp respectively coupled to the source devices ES1-ESp and output interfaces IS0-IS2 respectively coupled to the access ports PA0-PA2 of the target device EC.

Such an interconnect circuit ICN is capable of routing transactions between the various source devices and the one or more target devices.

Transactions may for example be write transactions or read transactions in the memory EC.

The structure of such an interconnect circuit ICN, which is in general a multilayer interconnect circuit, and the protocol allowing the exchange and routing of transactions in the interior of the interconnect circuit are well known to those skilled in the art.

The latter can, for example, refer to an article by Venkateswara Rao et al. entitled "A Frame work on AMBA bus based Communication Architecture to improve the Real Time Computing Performance in MPSoC", International Journal of Computer Applications (0975-8887), Volume 91—No. 5, April 2014; or a general presentation of these interconnect circuits given in 2015 by A. Gerstlauer and available at the Internet address http://users.ece.utexas.edu/~gerstl/ee382v_f14/lectures/lecture_12.pdf.

Moreover, by way of non-limiting indication, it is for example possible to use the interconnect sold by the company ARM under the reference NIC-400 (version Rop3).

As illustrated in FIG. 1, each input interface IEi of the interconnect circuit ICN is connected to a corresponding/respective source device ESi by an n-bit bus BSi.

In the example described here, the bus is a 32-bit bus.

Each transaction originating from a source device ESi is incorporated into an n-bit word called the "main word", which is transmitted over the bus BSi.

As is known in the art, a transaction, for example a write transaction, in particular contains an address field and control bits and a field of data to be written.

For example, the address contained in the transaction may be coded on 16 bits.

The system on chip 1 moreover includes control modules MCMi, more details on the structure and function of which will be given below, that are respectively assigned and coupled to the various source devices ES1-ESp and respectively connected to the corresponding input interfaces IE1-IEp by m-bit control buses BC1-BCp.

Each of the input interfaces IE1-IEp is therefore coupled to an n+m bit bus.

The size of the m of each bus BCi depends on the number of access ports of the one or more target devices EC.

In the present case, since the device EC has three access ports PA0, PA1 and PA2, for the device E, m equals 2.

Each control module therefore delivers 2 bits forming a control word that will be transmitted over the corresponding bus BCi conjointly with the 32-bit main word containing the transaction.

As will be seen in more detail below, the control modules MCMi are programmable.

In the example described here, the control modules are programmed by one of the source devices, in the present case the source device ESp, which here, for example, is an STM 32 microprocessor.

The 32-bit main word and the 2-bit control word form a 34-bit overall word.

Generally, the various 34-bit overall words BSGi are transmitted to the various output interfaces IS0-IS2 by a network of n+m track internal buses.

In the example described here (n=32 and m=2), the various 34-bit overall words BSGi are transmitted to the various output interfaces IS0-IS2 by a network of 34-track internal buses.

Each output interface is therefore configured to receive an n+m bit internal bus (34-bit bus in this example), in the present case internal bus BSGS0 for the interface IS0, internal bus BSGS1 for the interface IS1 and internal bus BSGS2 for the interface IS2.

In contrast, as illustrated in FIG. 1, only the n tracks (n=32 in this example) of the buses BSGS0, BSGS1 and BSGS2 intended to contain the transaction are connected to the access ports PA0, PA1, PA2.

In other words, the m tracks (here the 33rd and 34th tracks) that transmit the m-bit control word (here the 2-bit control word) are not connected to the corresponding access port.

Thus, the transaction delivered to an access port is identical to the transaction originating from a source device, whatever the selected access port.

Depending on the value of the control word delivered by the corresponding control module MCMi, the transaction originating from the corresponding source device will be routed either to the output interface IS0, and therefore to the access port PA0, or to the exit interface IS1 and therefore to the access port PA1, or to the exit interface IS2 and therefore to the access port PA2.

Thus, by way of non-limiting example, in the case where m=2, if the value of the control word is equal to bit sequence 00, the transaction will be routed to the access port PA0, whereas, if the value of the control word is equal to bit sequence 01, the transaction will be routed to the access port PA1, and if the value of the control word is equal to bit sequence 10, the transaction will be routed to the access port PA2.

In fact, in practice, the control bits are for example the two most significant bits of the address word contained in the transaction.

Thus, if the address word contained in the transaction is a 16-bit word, the address word transmitted over the network of internal buses of the interconnect circuit ICN is an 18-bit word. The interconnect circuit ICN therefore interprets the 18-bit word as an 18-bit address. The interconnect circuit ICN is then configured to route this 18-bit word either to the output interface IS0 or to the output interface IS1 or to the output interface IS2 depending on the value of the two most significant bits.

An interconnect circuit ICN is configured in a conventional way, for example in VHDL. Then this VHDL is converted into a hardware circuit including a control circuit, switches and buses and the various paths of which are defined by the configuration of the interconnect circuit ICN.

Reference is now more particularly made to FIGS. 2 to 5 to detail an example of management of the routing of transactions.

The target element EC, in the present case the multiport memory, includes an addressable memory space EMM that is sectorized or partitioned. Thus, in the example illustrated in FIG. 2, the memory space EMM includes sectors SCT0-SCTk. The number of sectors depends on the size of the memory space.

Depending on the envisaged application and/or on the nature of the one or more source elements, one or more sectors may be assigned a high priority with respect to other sectors assigned a low priority. The priority order may for example depend on the content stored in a sector. Thus, if one or more sectors include a program code that must always be accessible by one or more source elements, for example the microprocessor, whatever the density of the traffic in the interior of the interconnect circuit ICN, then the one or more sectors in question of the memory space will be assigned a high priority.

Furthermore, one of the access ports of the target device EC will for example be assigned to these priority sectors whereas the other sectors will be associated with the other access ports.

Figure 3:
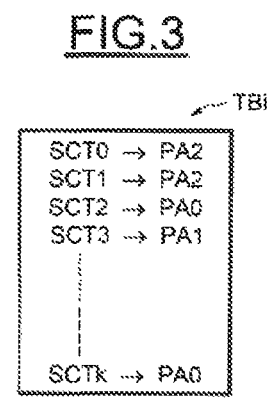

This correspondence between the sectors and access ports is stored, as illustrated in FIG. 3, in a table (look-up table) TBi. In practice there is one table TBi per source device. The content of the table may differ from one table to the next or be identical between certain at least of the tables.

Figure 4:
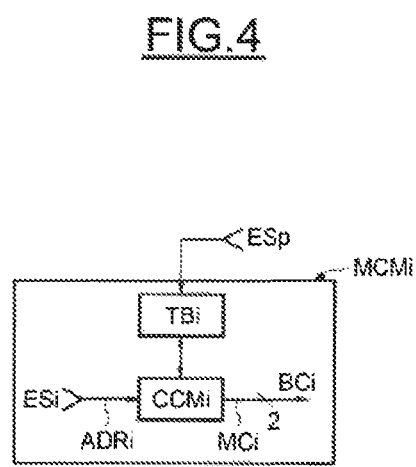

As illustrated in FIG. 4, the table TBi belongs to the control module MCMi associated with and coupled to the source element ESi.

This table TBi is programmable by one of the source devices, in the present case the source device ESp, which is the programmable core or the microprocessor.

The control module MCMi also includes a control circuit CCMi, produced for example using logic circuits, and configured to communicate with the table TBi and to receive the address word ADRi contained in each transaction Ti originating from the source element ESi.

Figure 5:
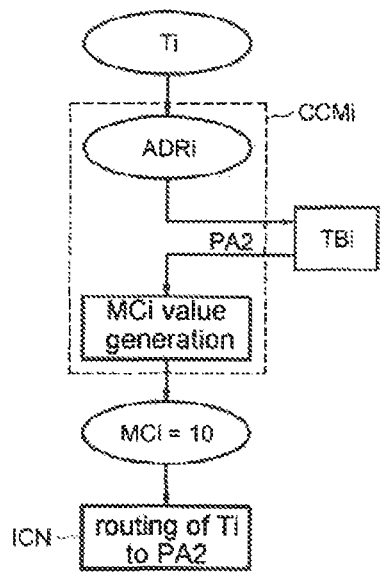

Furthermore, as illustrated in FIG. 5, from the address word ADRi, the control circuit CCMi determines to which sector of the memory space EMM this address word ADRi corresponds and therefore for which access port the transaction Ti is intended.

Knowing the destination access port, for example the access port PA2, the control circuit CCMi is then configured to generate the value of the control word MCi that will be delivered over the control bus BCi.

In the present case, since the access port PA2 is designated, the value of the control word MCi is equal to bit sequence 10 thereby allowing the interconnect circuit ICn to route the transaction Ti to the output interface IS2 and therefore to the access port PA2.

The programming of the tables TBi by the user, depending on the envisaged application, allows a great flexibility in the use of the system on chip. Thus, not only is it possible to change orders of priority depending on the application but it is also possible for other applications to assign, for one or more source devices for example, a given access port for all the sectors of the memory space EMM of the target device. This then amounts to assigning one access port to one source device and to routing all the transactions originating from this source device to this access port.

It is thus possible, depending on the nature of the source devices, to decide to route all the transactions from a source device to one access port and for example to route all the transactions originating from the other source devices to one or more other access ports.

Figure 6:
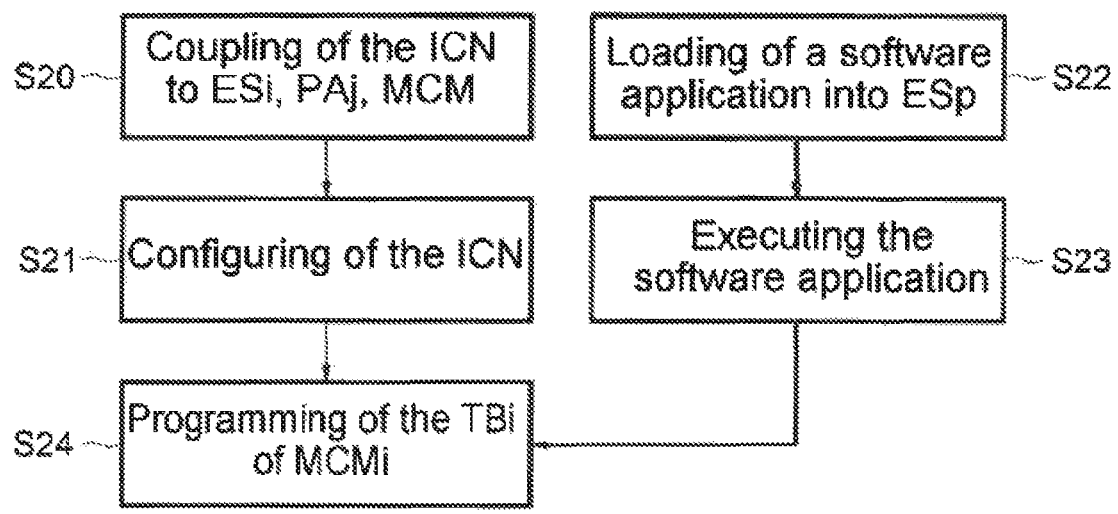

An example of management of the routing of transactions is illustrated in FIG. 6.

In a first step S20, the interconnect circuit ICN is coupled to the various source devices ESi, to the various access ports PAj, and to the control modules MCMi.

Next, in a step S21, the interconnect circuit ICN is configured so that the routing of a transaction to an access port depends on the logic value of the control word associated with this transaction.

Although in FIG. 6 step S21 is shown after step S20, it would of course be entirely possible to first configure the interconnect circuit ICN so as to produce it in hardware form, then to couple this interconnect circuit ICN with the source devices ESi, the access ports PAj, and the control modules MCMi.

In a step S22, a software application that contains instructions for programming the tables TBi of the control modules MCMi is loaded into the source device ESp, which in the present case is a microprocessor.

Thus, when the software application is executed (step S23), the modules MCMi and more particularly the tables TBi are programmed (step S24).

What is claimed is:

1. A system on chip, comprising:
    an interconnect circuit comprising an input interface and a plurality of output interfaces;
    a source device coupled to the input interface;
    a target device comprising a sectorized addressable memory space and a plurality of access ports respectively coupled to the plurality of output interfaces, the source device being configured to deliver a transaction containing an address word to the target device; and
    a programmable controller coupled to the source device and comprising:
        a table that is configured to indicate one of the plurality of access ports for each sector of the sectorized addressable memory space once the programmable controller has been programmed; and
        a control circuit configured to deliver a control word designating a selected access port indicated in the table based on the address word contained in the transaction to the interconnect circuit and in a presence of the transaction originating from the source device,
    wherein the interconnect circuit is configured to route the transaction from the input interface to a respective output interface that is coupled to the selected access port and to deliver the transaction to the selected access port; and
    wherein content of the transaction delivered to the selected access port is identical to content of the transaction delivered by the source device regardless of the selected access port designated by the control word.

2. The system on chip according to claim 1, wherein the programmable controller is programmable by the source device.

3. The system on chip according to claim 1, further comprising a plurality of other source devices respectively coupled to a plurality of corresponding other controllers, the interconnect circuit comprising a plurality of other input interfaces respectively coupled to the plurality of other source devices, wherein each of the plurality of corresponding other controllers is programmable by one of the plurality of other source devices.

4. The system on chip according to claim 3, wherein the one of the plurality of other source devices comprises a programmable core or a microprocessor.

5. The system on chip according to claim 3, wherein the one of the plurality of other source devices incorporates a software application containing instructions intended to program each table contained in each of the plurality of corresponding other controllers.

6. The system on chip according to claim 1, wherein the target device comprises a multiport memory.

7. A system on chip, comprising:
    an interconnect circuit comprising an input interface and a plurality of output interfaces;
    a source device coupled to the input interface;
    a target device comprising a sectorized addressable memory space and a plurality of access ports respectively coupled to the plurality of output interfaces, the source device being configured to deliver a transaction containing an address word to the target device; and
    a programmable controller coupled to the source device and comprising:
        a table that is configured to indicate one of the plurality of access ports for each sector of the sectorized addressable memory space once the programmable controller has been programmed; and
        a control circuit configured to deliver a control word designating a selected access port indicated in the table based on the address word contained in the transaction to the interconnect circuit and in a presence of the transaction originating from the source device,
    wherein the interconnect circuit is configured to route the transaction from the input interface to a respective output interface that is coupled to the selected access port and to deliver the transaction to the selected access port;
    wherein content of the transaction delivered to the selected access port is identical to content of the transaction delivered by the source device regardless of the selected access port designated by the control word; wherein the transaction is routed conjointly with the control word to the respective output interface; and wherein the respective output interface is configured to not deliver the control word to the selected access port.

8. The system on chip according to claim 7, wherein the transaction is incorporated within a main word of n bits, and wherein the control word comprises m additional bits, a value of m being at least equal to one and depending on a number of the plurality of access ports.

9. The system on chip according to claim 8, wherein the control circuit is configured to adjust a value of the m additional bits so as to designate the selected access port based on the address word contained in the transaction and based on the table, wherein the input interface is configured to receive an overall word of n+m bits including the main word and the control word, wherein the interconnect circuit is configured to route the overall word to the respective output interface, and wherein the respective output interface is configured to not deliver the control word to the selected access port.

10. The system on chip according to claim 9, wherein the input interface is coupled to the source device by an input bus of n tracks and to the programmable controller by a control bus of m tracks, wherein the overall word of n+m bits is to be routed over a network of internal buses of n+m tracks within the interconnect circuit, wherein the respective output interface is configured to receive an internal bus of n+m bits and is coupled to the selected access port by an output bus of n tracks, wherein m tracks of the internal bus of n+m tracks leading to the respective output interface is not connected to the selected access port.

11. A method for managing routing of transactions, the method comprising:
having a system on chip comprising a source device and a target device comprising a sectorized addressable memory space and a plurality of access ports, the source device delivering the transactions to the target device, each of the transactions comprising a respective address word, wherein the system on chip is equipped with an interconnect circuit comprising an input interface and a plurality of output interfaces and wherein the input interface is coupled to the source device and the plurality of output interfaces are respectively coupled to the plurality of access ports;
receiving, at the input interface, a transaction originating from the source device and a control word of programmable value associated with the transaction;
routing the transaction and the control word to a respective output interface of the plurality of output interfaces depending on a value of the control word;
delivering the transaction to a selected access port coupled to the respective output interface and so that the control word is not limited to the selected access port;
programming, for the source device, a table indicating a respective access port for each sector of the sectorized addressable memory space; and
adjusting, for the transaction, the value of the control word depending on the address word contained in the transaction and on content of the table.

12. The method according to claim 11, further comprising loading, into the source device, a software application containing instructions for programming the table, and programming the table by executing the software application.

13. The method according to claim 11, wherein the table is comprised in a programmable controller coupled to the source device and the input interface.

14. The method according to claim 11, further comprising receiving a plurality of other transactions from a plurality of other source devices respectively coupled to a plurality of corresponding other controllers, the interconnect circuit comprising a plurality of other input interfaces respectively coupled to the plurality of other source devices, wherein each of the plurality of corresponding other controllers is programmable by one of the plurality of other source devices.

15. The method according to claim 14, wherein the one of the plurality of other source devices comprises a programmable core or a microprocessor.

16. The method according to claim 14, wherein the target device comprises a multiport memory.

17. The method according to claim 11, further comprising conjointly routing the transaction with the control word to the respective output interface, and wherein the respective output interface is configured to not deliver the control word to the selected access port.

18. The method according to claim 17, wherein the transaction is incorporated within a main word of n bits, and wherein the control word comprises m additional bits, a value of m being at least equal to one and depending on a number of the plurality of access ports.

19. The method according to claim 18, further comprising:
adjusting a value of the m additional bits so as to designate the selected access port based on the address word contained in the transaction and based on the table;
receiving, at the input interface, an overall word of n+m bits including the main word and the control word; and
routing the overall word to the respective output interface without delivering the control word to the selected access port.

20. The method according to claim 19, wherein the input interface is coupled to the source device by an input bus of n tracks and to a programmable controller by a control bus of m tracks, wherein the overall word of n+m bits is to be routed over a network of internal buses of n+m tracks within the interconnect circuit, wherein the respective output interface is configured to receive an internal bus of n+m bits and is coupled to the selected access port by an output bus of n tracks, wherein m tracks of the internal bus of n+m tracks leading to the respective output interface is not connected to the selected access port.

21. The system on chip according to claim 1, wherein the transaction is incorporated within a main word of n bits, and wherein the control word comprises m additional bits, a value of m being at least equal to one and depending on a number of the plurality of access ports.

22. The system on chip according to claim 21, wherein the control circuit is configured to adjust a value of the m additional bits so as to designate the selected access port based on the address word contained in the transaction and based on the table, wherein the input interface is configured to receive an overall word of n+m bits including the main word and the control word, wherein the interconnect circuit is configured to route the overall word to the respective output interface, and wherein the respective output interface is configured to not deliver the control word to the selected access port.

* * * * *